United States Patent
Shah

(10) Patent No.: US 9,436,529 B2
(45) Date of Patent: Sep. 6, 2016

(54) PROVIDING RANDOM DATA TO A GUEST OPERATING SYSTEM

(71) Applicant: Red Hat, Inc., Raleigh, NC (US)

(72) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/583,370

(22) Filed: Dec. 26, 2014

(65) Prior Publication Data

US 2016/0188384 A1    Jun. 30, 2016

(51) Int. Cl.
| | | |
|---|---|---|
| G06F 13/00 | (2006.01) | |
| G06F 9/54 | (2006.01) | |
| G06F 9/455 | (2006.01) | |

(52) U.S. Cl.
CPC ........... *G06F 9/541* (2013.01); *G06F 9/45558* (2013.01); *G06F 2009/45591* (2013.01)

(58) Field of Classification Search
CPC .. G06F 9/4411; G06F 9/45533; G06F 9/541; H04L 63/0428
USPC .......................... 718/1; 719/319, 321; 726/14
See application file for complete search history.

(56) References Cited

U.S. PATENT DOCUMENTS

| | | | |
|---|---|---|---|
| 7,664,269 B2 | 2/2010 | Wood et al. | |
| 8,489,660 B2 | 7/2013 | Herbert et al. | |
| 9,049,232 B2 * | 6/2015 | Potlapally | H04L 63/164 |
| 2011/0047545 A1 * | 2/2011 | Ellison | G06F 7/588 |
| | | | 718/1 |
| 2013/0263114 A1 * | 10/2013 | Watkins | G06F 9/45558 |
| | | | 718/1 |
| 2014/0177832 A1 | 6/2014 | Tseng et al. | |
| 2015/0006601 A1 * | 1/2015 | Aissi | G06F 21/60 |
| | | | 708/250 |
| 2015/0106952 A1 * | 4/2015 | Bacher | G06F 21/60 |
| | | | 726/26 |
| 2015/0160924 A1 * | 6/2015 | Kiefer | G06F 21/602 |
| | | | 708/250 |
| 2015/0199217 A1 * | 7/2015 | Shankar | G06F 9/45533 |
| | | | 718/1 |
| 2015/0277856 A1 * | 10/2015 | Payne | G06F 7/588 |
| | | | 708/255 |

FOREIGN PATENT DOCUMENTS

| | | |
|---|---|---|
| DE | 102013004795 A1 | 9/2013 |
| WO | 2013101101 A1 | 7/2013 |

OTHER PUBLICATIONS

Ristenpart, Thomas and Yilek, Scott, "When Good Randomness Goes Bad: Virtual Machine Reset Vulnerabilities and Hedging Deployed Cryptography", Dept. of Computer Science and Engineering University of California, San Diego, USA, http://pages.cs.wisc.edu/~rist/papers/sslhedge.pdf, 2010, 18 pages.

L'Ecuyer, Pierre, "Random Number Generation", http://www.econstor.eu/bitstreann/10419/22195/1/21_pl.pdf, 2004, 40 pages.

(Continued)

*Primary Examiner* — Andy Ho
(74) *Attorney, Agent, or Firm* — Lowenstein Sandler LLP

(57) ABSTRACT

Implementations for providing random data to a guest operating system are disclosed. In one implementation, a method of the disclosure comprises: receiving, by a processing device of a host computer system, a first random data item from an external computer system; updating an entropy pool using the first random data item; and providing a virtual machine running on the host computer system with a second random data derived from the host entropy pool.

20 Claims, 5 Drawing Sheets

(56) References Cited

OTHER PUBLICATIONS

"20.5 Random Number Generator Device", https://access.redhat.com/documentation/en-US/ Red_hat_Interprise_Linux/7/htm/Virtualization_Deployment_and_Administration_Guide/sect Guest_virtual_machine_device_configuration-Random_number_generator_device.html, retrieved from the internet on Mar. 25, 2015, 4 pages.

libvirt: "Domain XML format", http://libvirt.org/formatdomain.html, retrieved from the internet on Mar. 25, 2015, 47 pages.

* cited by examiner

PROVIDING RANDOM DATA TO A GUEST OPERATING SYSTEM

TECHNICAL FIELD

The implementations of the disclosure is generally related to providing random data to a guest operating system, and is more specifically related to receiving, from client devices, random data by a guest operating system running on a virtual machine.

BACKGROUND

Guest operating systems running on virtual machines can use random numbers to accomplish different tasks, such as for games, animations, cryptography, electronic gambling, financial applications, etc. However, the guest operating systems may not have access to reliable random data that can be used to generate random numbers due to a low level of or infrequent user interface interaction and reliance on host systems to provide much of their random data.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
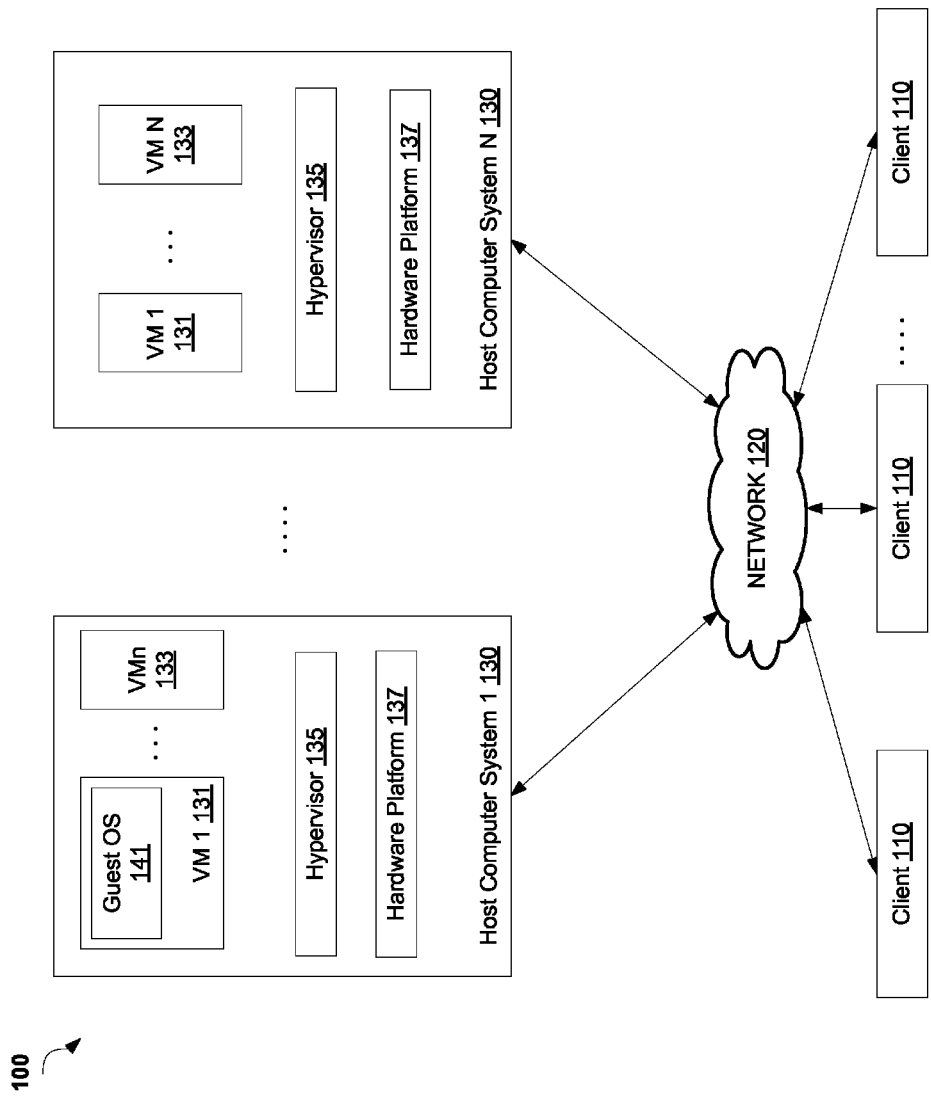
FIG. 1 is a block diagram of a network architecture in which implementations of the disclosure may operate.

Implementations of the disclosure provide random data to a guest operating system (OS) of a virtual machine. Random data can include one or more random bits, random numbers, pseudorandom numbers, sequences of symbols that lack any pattern, and/or any other suitable data that can be regarded as being suitably random. In some implementations of the disclosure, a random data item can comprise any suitable length of random bits, random numbers, symbols, characters, and/or other type of random data.

In one implementation of the disclosure, the guest OS can receive random data from one or more clients that interact with the guest OS. For example, the guest OS can receive a random data item (e.g., a sequence of random bits, a random number, etc.) from a client (e.g., a laptop computer, a mobile phone, etc.) via a communication channel (e.g., a Secure Shell connection) that is employed to transmit random data, keyboard inputs, mouse inputs, and/or any other suitable type of data. The received random data can then be added to a guest entropy pool residing on the virtual machine. For example, the received random data can be combined with a current value of the guest entropy pool to produce an updated value of the guest entropy pool. In some implementations, an entropy pool may be provided by a memory buffer comprising a plurality of random data items (e.g., random bits). The entropy pool may be from unauthorized access.

In another implementation of the disclosure, the guest OS can receive random data provided by one or more clients via a hypervisor of a host computer system, such as a host computer system running the virtual machine. The hypervisor can receive random data from one or more clients (e.g., clients that are communicatively coupled to the host computer system) via one or more communication channels. In some implementations of the disclosure, the communication channels can be established using the Simple Protocol for Independent Computing Environment (SPICE) protocol. Upon receiving the random data from one or more clients, the hypervisor can add the received random data to a host entropy pool. The hypervisor can provide the guest OS with random data from the host entropy pool on demand, periodically, at random time instances, or at any other suitable time.

Implementations of the disclosure may control access to the guest OS from the clients, in order to allow only authorized clients to provide random data to the guest OS. In an illustrative example, a client may provide random data to the guest OS upon successfully authenticating to the guest OS (e.g., using a user name, a password, etc. associated with an administrator account or any other account that is authorized to provide random data to the guest OS).

Implementations of the disclosure may also control access to random data provided by a given client from one or more virtual machines, in order to provide the random data from a given client to an authorized guest OS only.

Implementations of the disclosure increase the randomness of random data that can be used by a guest OS by allowing the guest OS to collect and combine random data from a variety of entropy sources, such as multiple clients, the hypervisor, etc. Even in the unlikely event that all the entropy sources are tainted, it would be extremely difficult to break cryptography obtained from combined random data sources from various entropy sources because there is a good chance that the entropy sources are tainted in different ways.

FIG. 1 is a block diagram of a network architecture 100 in which implementations of the disclosure may operate. The network architecture 100 includes, but is not limited to, one or more clients 110 communicatively coupled to one or more host computer systems 130 or a cluster of host computer systems 130 over a network 120. The clients 110 may include computing devices that have a wide range of processing capabilities. For example, each client 110 may be a personal computer (PC), palm-sized computing device, personal digital assistant (PDA), table computing device, mobile phone, wearable computing device, and so on. The clients 110 may be fat clients (e.g., clients that perform local processing and data storage), thin clients (e.g., clients that perform minimal or no local processing and minimal to no data storage), and/or hybrid clients (e.g., clients that perform local processing but little to no data storage).

The clients 110 may access the host computer systems 130 over the network 120. In some implementations of the disclosure, one or more virtual machines (VMs) may run on a host computer system 130.

The network 120 may be a private network (e.g., a local area network (LAN), a wide area network (WAN), intranet, etc.) or a public network (e.g., the Internet). The network 120 can provide one or more communication channels for the host computer system(s) 130 and the client device(s) 120 to exchange data, commands, and the like. These communication channels can be established using any suitable network protocol, such as the Secure Shell (SSH) protocol, the Simple Protocol for Independent Computing Environments (SPICE) protocol, and/or any other suitable network protocol that can facilitate interactions and/or communication between the host computer systems 130 and the clients 110.

Each host computer system 130 may host one or more virtual machines (VMs) 131, 133, which may run under control of a hypervisor 135. The hypervisor 135 may emulate the underlying hardware platform 137 of the host computer system 130 for the VMs 131, 133. The hypervisor 135 may also be known as a virtual machine monitor (VMM) or a kernel-based hypervisor. In some implementations, the hypervisor 135 is part of an operating system (OS) of the host computer system 130 (e.g., a host OS).

VMs 131, 133 can be, for example, hardware emulation, full virtualization, paravirtualization, and operating system-level virtualization VMs. Each VM 131, 133 includes a guest operating system (OS) 141 that may be different from one VM to another VM. The guest OS may include Microsoft Windows™, Linux™, Solaris™, Mac™ OS, Android™, and so on. The guest OS may host one or more applications within the VM 131, 133. Moreover, the guest OSes and the host OS may share the same OS type, or the host OS may be a different type of OS than one or more guest OSes.

In one embodiment, each VM 131, 133 hosts or maintains a desktop environment providing virtual desktops for remote clients 110. A virtual desktop is a virtualized desktop computer, and thus includes storage, an OS, applications installed on the OS (e.g., word processing applications, spreadsheet application, web browsing applications, email applications, etc.), and so on. However, rather than these functions being provided and performed at the clients 110, they are instead provided and performed by the VM 131, 133. In other embodiments, the VMs 131, 133 are not virtual desktops.

In one embodiment, the clients 110 may act as input/output (I/O) devices, in which a user can view a desktop environment provided by a VM 131, 133 (e.g., a running instances of an OS including storage available to the OS and programs installed and/or running on an OS) on a monitor, and interact with the desktop environment via a keyboard, mouse, microphone, camera, Universal Serial Bus (USB) device, printer, etc. In one embodiment, a majority of the processing is not performed at the clients 110, and is instead performed by the VMs 131, 133 hosted by the host computer system 130. From the user's point of view, the virtual desktop functions as a physical desktop (e.g., a personal computer) and is indistinguishable from a physical desktop.

In some implementations, the guest OS 141 and/or the hypervisor 135 may interact with the clients 110 and access devices coupled to the clients 110 via one or more communication channels (e.g., one or more channels established using the SPICE protocol). For example, the guest OS 141 and/or the hypervisor 135 may access and/or use a printer coupled to one or more clients 110. As another example, the guest OS 141 and/or the hypervisor 135 may access and/or use a keyboard, a mouse, and the like that is coupled to one or more clients 110 for input within the guest OS 141 and/or the hypervisor 135. As yet another example, the guest OS 141 and/or the hypervisor 135 may access and/or use a camera, a loud speaker, and/or a USB disk coupled to one or more clients 110 for audio content, video content, images, and the like.

In one implementation of the disclosure, each client 110 can collect random data to add entropy to one or more host computer systems 130. For example, the client 110 can measure one or more random events, such as mouse movements, keystrokes, audio inputs, video inputs, input/output interrupts, hard disk operations, and the like. The client 110 can then generate random data based on the measured random events (e.g., by converting the timing and/or content of a set of keystrokes into a set of random bits).

Each client 110 can transmit random data to one or more host computer systems 130. The random data can be transmitted periodically (e.g., every few seconds, every few minutes, and the like), on demand, at random time instances, or at any other suitable time. In some implementations of the disclosure, upon receiving the random data, the host computer system(s) 130 can use the random data to update an entropy pool (e.g., guest entropy pool 214 and/or a host entropy pool 250 as described below in connection with FIG. 2).

In some implementations of the disclosure, the host may poll one or more clients 110 for random data. Alternatively or additionally, a client device 110 can initiate transmission of random data to a host computer system 130 (e.g., upon the host computer system 130 authenticating a user associated with the client device 110).

In one implementation of the disclosure, each client 110 can transmit random data to the guest OS 141 using one or more communication channels, such as one or more communication channels established using a network protocol that can facilitate communications and/or interactions between a guest operating system and a client, such as the SSH protocol, the SPICE protocol, etc.

As another example, each client 110 can transmit random data to one or more hypervisors 135 using one or more communication channels, such as one or more communication channels established using the SPICE protocol and/or any other suitable network protocol that can facilitate communication between a hypervisor and a client.

In one implementation of the disclosure, random data can be transmitted from the clients 110 to host computer systems 130 via one or more communication channels that are employed to source random data. Alternatively or additionally, random data can be transmitted via a communication channel that is employed to transmit inputs (e.g., keyboard inputs, mouse inputs, and the like), pointer device positions, visibility and cursor shapes, audio content, video content, images, commands (e.g., graphic commands), messages, and/or any other suitable type of data.

In some implementations of the disclosure, the system 100 may control access to the VMs 131, 133 from one or more clients 110. For example, the system 100 can identify one or more clients 110 that are authorized to provide random data to a given VM (e.g., by prompting a user of the client(s) to provide identifying information related to the client(s) using one or more interfaces). In some implementations, the client(s) can be identified using any suitable identifying information, such as one or more IP address, a range of IP addresses, and/or any other information that can be used to identify the client(s) 110. The system 100 can then associate the identified clients 110 with the VM (e.g., by storing identifying information related to the identified clients 110 in association with the VM).

As another example, the system 100 may authorize one or more user accounts to provide random data to a given VM and associate the user accounts with the VM (e.g., by storing information related to the user accounts in association with the VM). In such an example, the system 100 may grant a client 110 access to the VM upon authenticating a user account that is authorized to provide random data to the VM (e.g., using a user name, a password, and/or any other credential associated with the user account).

A host computer system 130 may host VMs for multiple users (e.g., individuals, entities, etc.). Multiple host computer systems 130 may host VMs for a given user in some implementations. In one example, a user of the host computer system 130 may authorize one or more clients 110 to provide random data to one or more VMs associated with the user (e.g., by providing identifying information related to the client(s) using one or more user interfaces provided by the system 100). The system 100 may then associate information related to the clients with the user and/or VMs associated with the user. Upon receiving random data from one or more of the clients, the hypervisor 135 may update an entropy pool associated with the user, such as a guest entropy pool, a host entropy pool, etc. storing random data for VMs associated with the user. In some implementations, the entropy pool associated with the user stores random data derived from one or more clients that are associated with the user and/or that are authorized to provide random data to VMs associated with the user.

In another example, a user may authorize one or more VMs to request and/or receive random data from an entropy pool associated with the user (e.g., by providing identifying information related to the VMs using one or more user interfaces provided by the system 100). In such an example, the host computer system 130 may associate the VMs with the user (e.g., by storing information related to the VMs in association with information related to the user). As further described below in connection with FIG. 2, the hypervisor 135 may provide a VM with random data derived from the entropy pool associated with the user if the VM is associated with the user.

In some implementations of the disclosure, the system 100 can control access to random data from a given client 110 to one or more authorized VMs. For example, the system 100 can identify one or more VMs that are authorized to receive random data from the client 110 (e.g., by prompting a user of the client 110 to provide identifying information related to the VM(s) using one or more interfaces). In some implementations, the VM(s) can be identified by any suitable identifying information, such as an IP address, a hostname, an identifier, and/or any other information that can be used to identify the VM(s). The system 100 can then store the identifying information related to the identified VMs in association with the client 131. In some implementations, the system 100 provides random data and/or any other data originated from the client 110 to the authorized VM(s) only.

Figure 2:
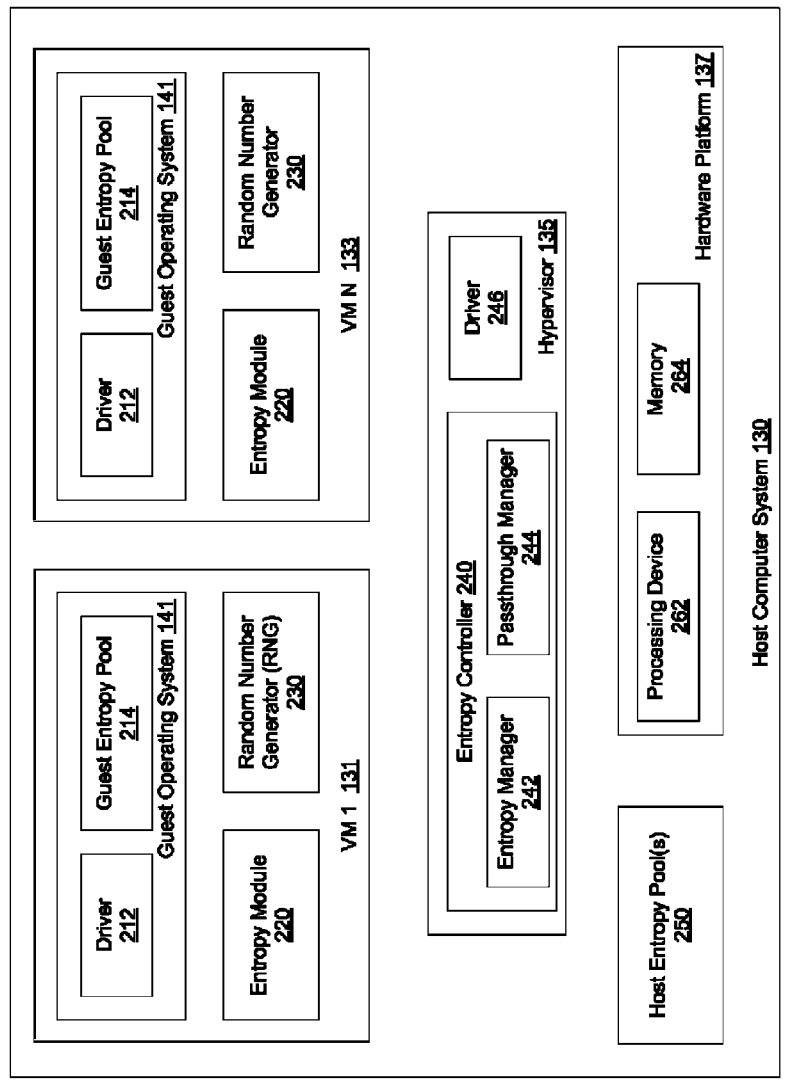
FIG. 2 is a block diagram of a host computer system according to one implementation of the disclosure.

Each host computer system 130 may comprise several components, as depicted in FIG. 2. FIG. 2 shows a generalized schematic illustration of a host computer system 130 in accordance with some implementations of the disclosed subject matter. The host computer system 130 may be implemented using software components, hardware components, or combination thereof.

As shown in FIG. 2, each VM 131, 131 of the host computer system 130 may comprise a guest OS 141 that further comprises a driver 212 and a guest entropy pool 214, an entropy module 220, a random number generator 230, and/or any other suitable component. The hardware platform 137 may comprise a processing device 262 and memory 264.

The hypervisor 135 can include an entropy controller 240 and a driver 246. The entropy controller 240 can collect random data from one or more entropy sources and provide random data to one or more entropy consumers, such as the guest OS 141. In some implementations, the entropy controller 240 may determine whether a client is authorized to provide random data to the guest OS 141 (e.g., by comparing information related to the client and information related to clients that are authorized to provide random data to the VM 131, 133). The entropy controller 240 may block random data and/or any other data transmitted from the client in response to determining that the client is not authorized to provide random data to the guest OS 141. Alternatively, in response to determining that the client is authorized to provide random data to the guest OS 141, the entropy controller 240 may provide random data originated from the client to the guest OS 141 as further described below.

In some implementations, the entropy controller 240 may determine whether the guest OS is authorized to request and/or receive random data from a given client (e.g., by comparing information related to the VM 131, 133 and information related to VMs that are authorized to request and/or receive random data from the client). The entropy controller 240 may provide random data sourced from the client to the guest OS 141 as further described below in response to determining that the guest OS 141 is authorized to request and/or receive random data from the client.

To perform these and other functions, the entropy controller 242 can include various components, such as an entropy manager 242 and a passthrough manager 244. In some implementations of the disclosure, the entropy controller 240 can be implemented by the host OS of the host computer system 130.

The entropy manager 242 can receive random data from one or more entropy sources, such as one or more clients 110 of FIG. 1, the hardware platform 137, and/or any other suitable entropy source that can provide random data (e.g., a hardware random number generator (HWRNG) device). The random data can be received periodically (e.g., every few seconds, every few minutes, and the like), on demand, at random time instances, or at any other suitable time.

Upon receiving random data (e.g., a number of random bits) from a client, the entropy manager 242 can use the received random data to update a host entropy pool 250. For example, the entropy manager 242 can combine the received random data with a current value of at least part of the host entropy pool 250 using a hash function (e.g., the Secure Hash Algorithm (SHA)), one or more logical exclusive or (XOR) operations, and/or any other suitable operation that can be performed to add random data to an entropy pool. In some implementations of the disclosure, a host entropy pool 250 can be a storage device (e.g., a memory buffer) of a certain size that is employed for storing random data (e.g., random bit sequences).

In some implementations of the disclosure, the entropy manager 242 can receive random data from a variety of entropy sources, such as one or more clients 110 of FIG. 1, the hardware platform 137, and/or other suitable entropy source. The entropy manager 242 can then combine the random data from the entropy sources and use the combined random data to update the host entropy pool 250. For example, the entropy manager 242 can receive random data items from various entropy sources (e.g., multiple clients 110) and can then combine the random data items into combined random data (e.g., a combined random data item) using a hash function, one or more logical exclusive or (XOR) operations, and/or any other suitable operation that can be performed to combine random data from various sources.

The passthrough manager 244 can provide random data to a guest operating system, such as the guest OS 141, a guest OS that is not running on the host computer system 130, and the like. For example, a virtual device driver of the host OS (e.g., the driver 246) can receive a request for random data transmitted from the guest OS 141 (e.g., via a virtual device driver 212 of the guest OS 141). The passthrough manager 244 (or other component of the hypervisor 135) can then process the request and provide random data to the guest OS 141. For example, the passthrough manager 244 can provide the guest OS 141 with a random data item (e.g., a sequence of random bits) derived from the host entropy pool 250. In one implementation, the request for random data can include a request for a particular number of random bits. The passthrough manager 244 can derive a random data item including the requested number of random bits from the host entropy pool 250. Alternatively or additionally, the passthrough manager 244 can derive a random data item of a predetermined number of random bits and/or any other suitable amount of random data.

In some implementations, the passthrough manager 244 can provide random data to the guest OS 141 in any suitable manner. For example, the passthrough manager 244 can emulate a physical random number generator (RNG) in the hypervisor.

As another example, the passthrough manager 244 can provide random data to the guest OS 141 using an entropy module 220 (e.g., a virtual device accessible by the guest OS 141 via a virtual device driver 212). For example, the passthrough manager 244 can transmit a random data item (e.g., a sequence of random bits derived from the host entropy pool 250) to the entropy module 220. The guest OS 141 can communicate with the entropy module 220 and receive the random data item via the driver 212.

In some implementations of the disclosure, the entropy module 220 can be a paravirtualized device (e.g., virtio RNG). A paravirtualized device is a type of virtual device that is supported by a paravirtualization API in order to avoid the overhead of emulating the real hardware. For paravirtualized devices, a driver that interfaces with the paravirtualized device can be installed in the guest OS 141. In some operating systems (e.g., Linux™, Microsoft Windows™, etc.), this interface is referred to as the "virtio" interface. Virtio provides an efficient abstraction for hypervisors and a common set of I/O virtualization drivers.

In some implementations of the disclosure, the guest OS 141 can communicate with one or more client devices (e.g., one or more clients 110 of FIG. 1) via one or more communication channels. For example, an SSH channel can be established between the guest OS 141 and a client 110 upon the guest OS 141 authenticating the client device 110 (e.g., using a user name, a password, etc. associated with the client device 110 and/or a user of the client device 110) and/or verifying the identity of the client 110 (e.g., using a pair of cryptographic keys). The guest OS 141 can then receive random data from the client 110 via the SSH channel.

Upon receiving random data from one or more entropy sources, the guest OS 141 can update the guest entropy pool 214 using the received random data. For example, a component of the guest OS 141 (e.g., a program and/or script) can generate an updated value of the guest entropy pool by combining the received random data with a current value of at least part of the guest entropy pool 214 using a hash function (e.g., the SHA), one or more logical exclusive or operations, and/or any other suitable operation that can be performed to add random data to an entropy pool.

In some implementations of the disclosure, the guest OS 141 can receive random data from a variety of entropy sources, such as one or more clients 110 of FIG. 1, the hypervisor 135, one or more HWRNG devices, and/or any other suitable entropy source. The guest OS 141 can then update the guest entropy pool 214 using the received random data. For example, the guest OS 141 can receive multiple random data items (e.g., sequences of random bits) from multiple entropy sources. The guest OS 141 can combine the random data items into a combined random data item using a hash function, a logical exclusive or operation, and/or any other suitable operation that can be performed to combine random data from various sources. The guest OS 141 can then update the guest entropy pool 214 using the combined random data item.

In one implementation, when the guest entropy pool 214 needs more entropy, the guest OS 141 may transmit a request for random data to one or more entropy sources, such as one or more clients 110, the hypervisor 135, etc. For example, the guest OS 141 may transmit a request for random data to the hypervisor 135 via the driver 212, the entropy module 220, and the driver 246. As another example, the guest OS 141 may transmit a request for random data to one or more clients 110 via an SSH session. In some implementations of the disclosure, when an application of the guest OS is depleting the guest entropy pool 214 at a predetermined rate (e.g., a rate that exceeds a threshold), the guest OS 141 can request more entropy. Alternatively or additionally, the guest OS 141 can request entropy when the available entropy in the guest entropy pool 214 is below a threshold amount.

In some implementations, the VM 131, 133 may be provided with random data derived from the guest entropy pool 214. For example, the guest OS 141 or any other suitable component of the VM 131, 133 can derive a random data item from the guest entropy pool 214 (e.g., using a hash function). The guest OS 141 can then provide the random data item to the random number generator 230 for random number generation. In some implementations, the random number generator 230 can generate random numbers using the random number item as a seed value. Random numbers can be generated using a hash function, a linear congruential generator, a linear feedback shift register, a probability density function, and/or any other suitable operation that can be performed to produce a random number from a seed value.

In some implementations of the disclosure, the random numbers can be used for key generation. Cryptographic keys (e.g., private keys, public keys, session keys, and the like) can be generated using the random numbers. In some implementations of the disclosure, the cryptographic keys can be used for secure data communication between the clients 110 and the host computer systems 130.

The hardware platform 137 can include hardware components such as one or more physical processing devices (e.g., central processing units (CPUs) 262, memory 264, and/or any other suitable hardware components). In one implementation, the hardware platform 137 includes one or more physical devices (not shown), which can be audio/video devices (e.g., video cards, sound cards, etc.), network interface devices, printers, graphics modules, graphics devices, system components (e.g., PCI devices, bridges, ports, buses, etc.), etc. The host computer system 130 may include any number of devices.

In some implementations of the disclosure, the host computer system 130 may comprise multiple host entropy pools 150. In one example, a host entropy pool 150 may store random data for one or more particular VMs, such as the VMs running on the host computer system 130. In such an example, each VM running on the host computer system 130 may request and/or receive random data derived from the host entropy pool. The VMs running on the host computer system 130 may be associated with multiple users of the host computer system 130.

In another example, a host entropy pool 250 may store random data for a particular user of the host computer system 130. In such an example, the hypervisor 135 may provide VMs associated with the user with random data derived from the host entropy pool. The VMs associated with the user may run on one or more host computer systems 130. The hypervisor 135 may deny access to random data derived from the host entropy pool from a VM that is not associated with the particular user and/or a VM that is not authorized to receive random data from the host entropy pool.

In one example, upon receiving random data from a client that is authorized to provide random data to VMs associated with the user, the entropy manager 242 may identify a host entropy pool 250 that is associated with the user and may then update the identified host entropy pool using the received random data. In such an example, the passthrough manager 244 provides random data derived from the host entropy pool to operating systems of VMs that are associated with the user and/or that are authorized to receive random data from the host entropy pool.

In a more particular example, upon receiving a request for random data from a guest OS of a VM (e.g., a VM running on the host computer system 130 or any other host computer system), the passthrough manager 244 may determine whether the VM is associated with a particular user. Alternatively or additionally, the passthrough manager 244 may determine whether the VM is authorized to request and/or receive random data from a host entropy pool associated with the user. In response to determining that the VM is associated with the user and/or that the VM is authorized to request and/or receive random data from a host entropy pool associated with the user, the passthrough manager 244 may identify a host entropy pool that is associated with the user and may then provide the VM with random data (e.g., a random data item) derived from the identified host entropy pool.

Alternatively, the passthrough manager 244 may identify a host entropy pool that stores random data for VMs running on the host computer system 130 and/or VMs associated with multiple users in response to determining that the VM is not associated with a particular user and/or that the VM is not authorized to receive and/or request random data from host entropy pools that are associated with particular users of the host computer system 130. The passthrough manager 244 may then provide the VM with random data (e.g., a random item) derived from the identified host entropy pool.

Figure 3:
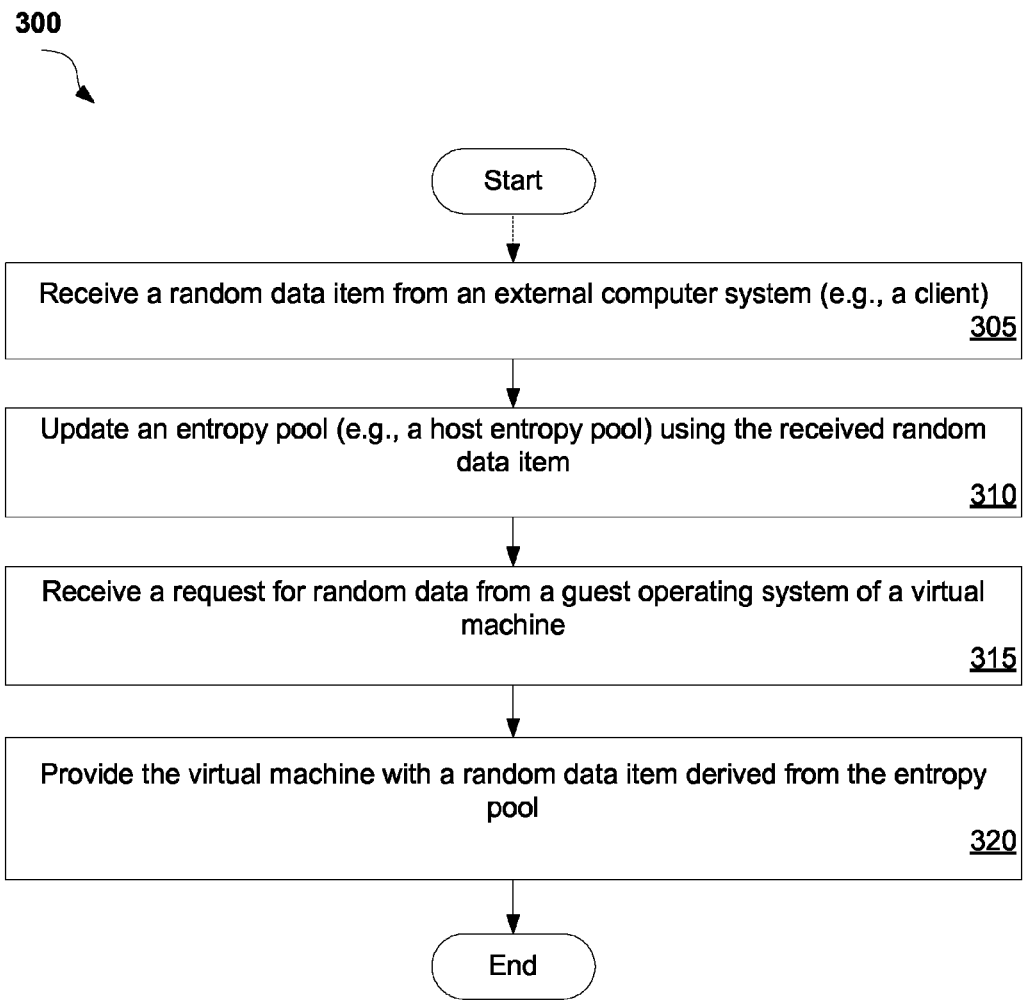
FIG. 3 is a flow diagram illustrating a method for providing random data to a guest operating system according to one implementation of the disclosure.

FIG. 3 is a flow diagram illustrating a method 300 for providing random data to a guest operating system according to one implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by a processing device (e.g., the processing device 502 of FIG. 5) executing the hypervisor 135 as described with respect to FIGS. 1 and 2.

As shown in FIG. 3, method 300 may begin at block 305, where the hypervisor receives a random data item from an external computer system. For example, the hypervisor can receive a set of random bits from a client 110 of FIG. 1 via one or more suitable communication channels. In one implementation, the hypervisor can receive the random data item via a dedicated communication channel for transmission of random data between the external computer system (e.g., the client 110 of FIG. 1) and the hypervisor. Alternatively or additionally, the hypervisor can receive the random data item via a communication channel employed to transmit any other suitable type of data, such as keyboard inputs, mouse inputs, pointer device positions, visibility and cursor shapes, audio content, video content, images, graphic commands, and the like. In some implementations of the disclosure, the communication channels can be established using the SPICE protocol.

At block 310, the hypervisor can update an entropy pool using the received random data item. For example, the hypervisor can generate an updated value of the entropy pool by combining the received random data with a current value of at least part of the entropy pool using a hash function, a logical exclusive or operation, and/or any other suitable operation that can be performed to add random data to an entropy pool. In one implementation, the entropy pool can be an entropy pool of a host operating system of the host computer system, such as the host pool 250 as described with respect to FIG. 2.

At block 315, the hypervisor can receive a request for random data from a guest operating system of a virtual machine. In some implementations of the disclosure, the request can include a request for a particular number of random bits. In one implementation, the virtual machine can be running on the processing device that executes the hypervisor. Alternatively, the virtual machine can be running on another processing device. In some implementations of the disclosure, random data can be requested for a specific application (e.g., the random number generator 230 of FIG. 2). Alternatively or additionally, the guest operating system includes a guest entropy pool and the virtual machine may request for random data when the guest entropy pool is below a threshold level. In some implementations, the hypervisor can receive the request for random data via a virtual driver device of the hypervisor (e.g., the driver 246 of FIG. 2), a virtual driver device of the virtual machine (e.g., the driver 212 of FIG. 2), and a virtual device that can facilitate interactions between the virtual driver device of the hypervisor and the virtual driver device of the guest operating system (e.g., the entropy module 220 of FIG. 2).

At block 320, the hypervisor can provide the virtual machine with a random data item derived from the entropy pool. For example, the hypervisor can provide the virtual machine with a number of random bits that are requested by the guest operating system. As another example, the hypervisor can provide the virtual machine with a predetermined number of random bits and/or any other suitable amount of random data from the entropy pool.

Figure 4:
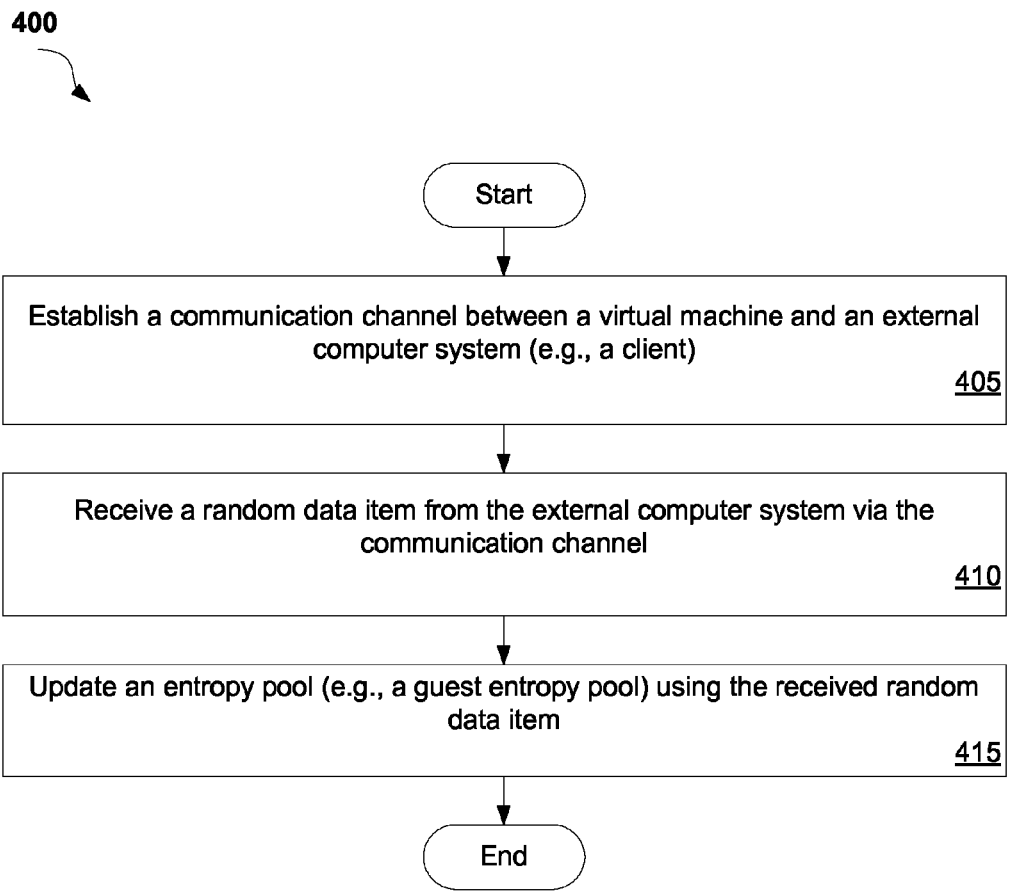
FIG. 4 is a flow diagram illustrating a method for providing random data to a guest operating system according to another implementation of the disclosure.

FIG. 4 is a flow diagram illustrating a method 400 for providing entropy to a guest operating system according to another implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by running on a processing device (e.g., the processing device 502 of FIG. 5) executing a guest operating system of a virtual machine (e.g., the guest OS 141 of FIGS. 1 and 2).

As shown, method 400 may begin at block 405, where a communication channel is established between a virtual machine and an external computer system, such as a client 110 as described above in connection with FIGS. 1 and 2. For example, as described above in connection with FIGS. 1 and 2, an SSH channel can be established between the guest operating system of the virtual machine and a client 110. In some implementations of the disclosure, the communication channel can be established upon the guest operating system authenticating the client and/or a user associated with the client using authentication credentials provided by the client (e.g., a user name, a password, etc.). Alternatively of additionally, the communication channel can be established upon the guest operating system verifying the identity of the client (e.g., using a pair of cryptographic keys).

In some implementations of the disclosure, the communication channel can be a dedicated communication channel for transmission of random data between the external computer system and the guest operating system. Alternatively or additionally, the communication channel can be employed to transmit any other suitable type of data, such as messages, commands, audio content, video content, images, web content, keyboard inputs, mouse inputs, pointer device positions, visibility and cursor shapes, and the like. The communication channel can be established using the SSH protocol and/or any other suitable network protocol that can be used to establish a communication channel between an external computer system and a virtual machine.

At 410, the virtual machine can receive a random data item from the external computer system via the communication channel. In one implementation, the random data item can include a set of random bits generated by the client. In some implementations, the random data item can be transmitted to the virtual machine at any suitable time (e.g., periodically, on demand, at random time instances, etc.). The virtual machine may receive any other data along with the random data item, such as padding bits, a header that identifies a type of payload, bits indicative of the start of a packet, bits indicative of the end of a packet, one or more connection identifiers, control commands for re-syncing the connection between two end-points, etc.

At 415, the virtual machine can update an entropy pool using the received random data item. The entropy pool can be on the guest operating system, such as the guest entropy pool 214 as described above in connection with FIG. 2. In some implementations, the guest operating system of the virtual machine can update the entropy pool using the random data item in any suitable manner. For example, the random data item can be combined with a current value of at least part of the entropy to generate an updated value of the entropy using a hash function, one or more XOR operations, and/or any other suitable operation that can be performed to add random data to an entropy pool. As another example, the random data item can be combined with random data provided by other entropy sources (e.g., other clients, a hypervisor, a HWRNG device, etc.) to produce combined random data (e.g., a combined random data item). The entropy pool can then be updated using the combined random data (e.g., by combining the combined random data with a current value of at least part of the entropy pool).

Figure 5:
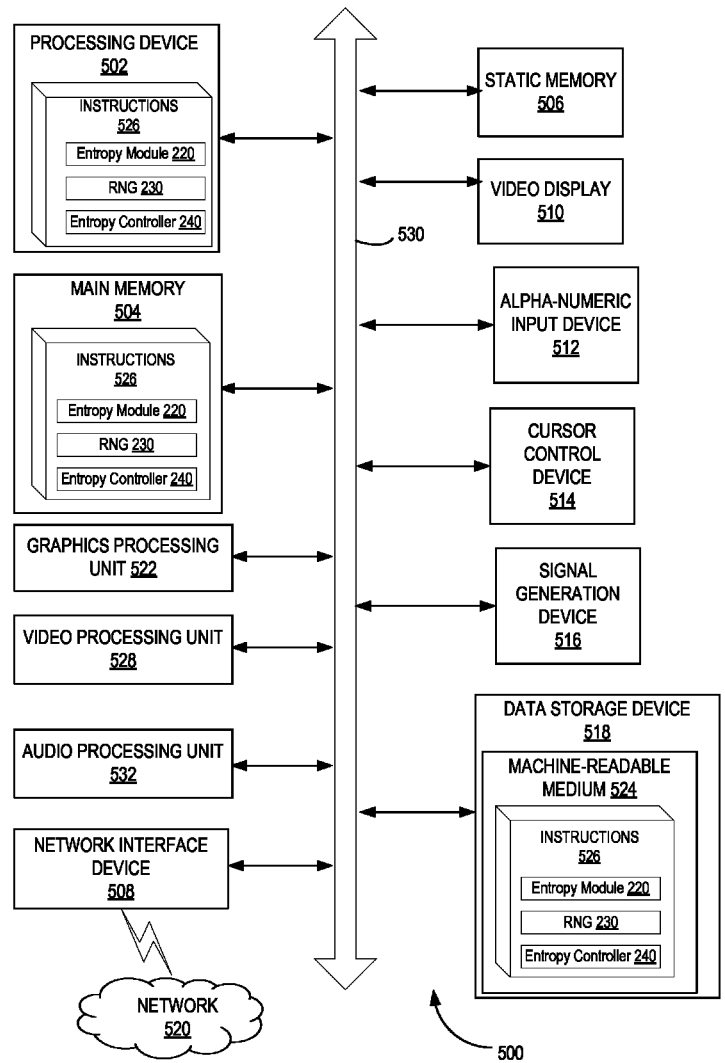
FIG. 5 illustrates a block diagram of one implementation of a computer system.

FIG. 5 illustrates a diagrammatic representation of a machine in the exemplary form of a computer system 500 within which a set of instructions, for causing the machine to perform any one or more of the methodologies discussed herein, may be executed. The computer system 500 may correspond to one of the clients 110 or one of the host computer systems 130 of FIG. 1. In embodiments of the disclosure, the machine may be connected (e.g., networked) to other machines (e.g., other components of the system 100) in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 502 may therefore include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, system on chip (SoC), or the like. The computer system 500 may include a graphics processing unit 522, a video processing unit 528, and an audio processing unit 532.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 524 on which is stored one or more sets of instructions 526 embodying any one or more of the methodologies or functions described herein (e.g., instructions executed by the entropy module 220, the random number generator 230, and/or the entropy controller 240). The instructions 526 may also reside, completely or at least partially, within the main memory 504 and/or within the processing device 502 during execution thereof by the computer system 500, the main memory 504 and the processing device 502 also constituting machine-readable storage media.

While the computer-readable storage medium 524 is shown in an exemplary embodiment to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIGS. 1-4) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding," "receiving," "determining," "routing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, using a processing device of a first host computer system, a first random data item from an external computer system;
   updating an entropy pool using the first random data item; and
   providing a first virtual machine running on the first host computer system with a second random data item derived from the entropy pool.

2. The method of claim 1, wherein providing the first virtual machine with the second random data item further comprises transmitting the second random data item to the first virtual machine via a virtual device driver.

3. The method of claim 1, wherein updating the entropy pool is performed by the first virtual machine.

4. The method of claim 1, wherein updating the entropy pool using the first random data item comprises combining the first random data item with a current value of at least part of the entropy pool.

5. The method of claim 1, wherein receiving the first random data item comprises receiving the first random data item via a communication channel that is employed to transmit at least one of keyboard inputs, mouse inputs, commands, pointer device positions, visibility and cursor shapes, audio content, video content, or images.

6. The method of claim 1, wherein receiving the first random data item comprises receiving the first random data item via a dedicated communication channel.

7. The method of claim 1, further comprising:
determining that the external computer system is authorized to provide random data to virtual machines associated with a user; and
updating the entropy pool using the first random data item in response to determining that the entropy pool is associated with the user.

8. The method of claim 7, further comprising:
receiving a request for random data from a second virtual machine; and
providing the second virtual machine with a third random data item derived from the entropy pool in response to determining that the second virtual machine is associated with the user.

9. The method of claim 8, wherein the second virtual machine is running on the first host computer system.

10. The method of claim 8, wherein the second virtual machine is running on a second host computer system.

11. The method of claim 1, further comprising providing a plurality of virtual machines running on the first host computer system with random data derived from the entropy pool, wherein the plurality of virtual machines are associated with a plurality of users.

12. The method of claim 1, further comprising:
receiving, from a plurality of external computer systems, a plurality of random data items;
generating, using the processing device, combined random data using the plurality of random data items; and
updating the entropy pool using the combined random data.

13. A system comprising:
a memory device; and
a processing device of a host computer system, communicably coupled to the memory device, to:
receive a first random data item from an external computer system;
determine that the external computer system is authorized to provide random data to virtual machines associated with a user of the host computer system;
update an entropy pool using the first random data item in response to determining that the entropy pool is associated with the user; and
provide a virtual machine running on the host computer system with a second random data item derived from the entropy pool.

14. The system of claim 13, wherein, to provide the virtual machine with the second random data item, the processing device is further to transmit the second random data item to the virtual machine via a virtual device driver.

15. The system of claim 13, wherein the processing device is further to receive the first random data item via a communication channel that is employed to transmit at least one of keyboard inputs, mouse inputs, commands, pointer device positions, visibility and cursor shapes, audio content, video content, or images.

16. The system of claim 13, wherein the processing device is further to:
receive, from a plurality of external computer systems, a plurality of random data items;
generate, using the processing device, combined random data by combining the plurality of random data items; and
update the entropy pool using the combined random data.

17. A non-transitory machine-readable storage medium including instructions that, when accessed by a processing device of a host computer system, cause the processing device to:
receive, by the processing device, a first random data item from an external computer device;
update an entropy pool using the first random data item; and
provide a virtual machine running on the host computer system with a second random data item derived from the entropy pool.

18. The non-transitory machine-readable storage medium of claim 17, wherein, to provide the virtual machine with the second random data item, the processing device is further to transmit the second random data item to the virtual machine via a virtual device driver.

19. The non-transitory machine-readable storage medium of claim 17, wherein the entropy pool is updated by the virtual machine.

20. The non-transitory machine-readable storage medium of claim 17, wherein the processing device is further to receive the first random data item via a communication channel that is employed to transmit at least one of keyboard inputs, mouse inputs, commands, pointer device positions, visibility and cursor shapes, audio content, video content, or images.

* * * * *